(12) United States Patent
Kishiyama et al.

(10) Patent No.: US 9,794,968 B2
(45) Date of Patent: Oct. 17, 2017

(54) COMMUNICATION SYSTEM, MOBILE TERMINAL APPARATUS, LOCAL AREA BASE STATION AND COMMUNICATION METHOD

(71) Applicant: NTT DOCOMO, INC., Tokyo (JP)

(72) Inventors: Yoshihisa Kishiyama, Tokyo (JP);
Anass Benjebbour, Tokyo (JP);
Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/390,137

(22) PCT Filed: Apr. 5, 2013

(86) PCT No.: PCT/JP2013/060481
§ 371 (c)(1),
(2) Date: Oct. 2, 2014

(87) PCT Pub. No.: WO2013/151160
PCT Pub. Date: Oct. 10, 2013

(65) Prior Publication Data
US 2015/0078281 A1    Mar. 19, 2015

(30) Foreign Application Priority Data

Apr. 6, 2012 (JP) ................................ 2012-087595

(51) Int. Cl.
*H04W 4/00* (2009.01)
*H04W 76/02* (2009.01)
(Continued)

(52) U.S. Cl.
CPC ....... *H04W 76/021* (2013.01); *H04J 11/0023* (2013.01); *H04J 11/0069* (2013.01);
(Continued)

(58) Field of Classification Search
CPC ... H04W 76/021; H04W 48/18; H04W 74/00; H04W 16/32; H04J 11/0023; H04J 11/0069; H04L 5/001; H04L 5/0048
See application file for complete search history.

(56) References Cited

U.S. PATENT DOCUMENTS 9,609,641 B2 * 3/2017 Kakishima .......... H04W 72/042
2008/0267269 A1 * 10/2008 Enescu ................. H04L 1/0079
375/219
(Continued)

FOREIGN PATENT DOCUMENTS

JP    2011-142620 A    7/2011
JP    2011234052 A     11/2011
(Continued)

OTHER PUBLICATIONS

International Search Report for corresponding International Application No. PCT/JP2013/060481, mailed May 7, 2013 (2 pages).
(Continued)

*Primary Examiner* — Kevin Mew
(74) *Attorney, Agent, or Firm* — Osha Liang LLP

(57) ABSTRACT

A user terminal apparatus is disclosed that is able to communicate with a base station apparatus in a given radio access scheme and detects the base station apparatus and/or a different communication apparatus from the base station apparatus, the user terminal including: a receiving circuit that receives signals from the base station apparatus and/or the communication apparatus, in the given radio access scheme, using subframes of a given demodulation reference signal configuration; and a transmission circuit that transmits signals to the base station apparatus and/or the communication apparatus, in a same radio access scheme as the given radio access scheme, using subframes of a same
(Continued)

demodulation reference signal configuration as the given demodulation reference signal configuration.

12 Claims, 11 Drawing Sheets

(51) Int. Cl.
| | |
|---|---|
| *H04W 48/18* | (2009.01) |
| *H04W 74/00* | (2009.01) |
| *H04J 11/00* | (2006.01) |
| *H04W 16/32* | (2009.01) |
| *H04L 5/00* | (2006.01) |

(52) U.S. Cl.
CPC .......... *H04L 5/0048* (2013.01); *H04W 48/18* (2013.01); *H04W 74/00* (2013.01); *H04L 5/001* (2013.01); *H04W 16/32* (2013.01)

(56) References Cited

U.S. PATENT DOCUMENTS

| | | | |
|---|---|---|---|
| 2010/0027504 A1* | 2/2010 | Ramamurthy | H04W 36/14 370/331 |
| 2010/0034152 A1 | 2/2010 | Imamura | |
| 2010/0303034 A1* | 12/2010 | Chen | H04L 5/0023 370/329 |
| 2011/0032839 A1* | 2/2011 | Chen | H04B 7/024 370/252 |
| 2011/0085516 A1* | 4/2011 | Pajukoski | H04L 5/001 370/330 |
| 2011/0110357 A1* | 5/2011 | Chung | H04W 48/08 370/344 |
| 2011/0170436 A1* | 7/2011 | Doan | H04B 7/155 370/252 |
| 2011/0199986 A1* | 8/2011 | Fong | H04L 5/0035 370/329 |
| 2011/0222588 A1* | 9/2011 | Ko | H04B 7/0689 375/135 |
| 2011/0235604 A1 | 9/2011 | Inoue et al. | |
| 2011/0243066 A1* | 10/2011 | Nayeb Nazar | H04L 1/007 370/328 |
| 2011/0267972 A1* | 11/2011 | Yoon | H04L 5/0023 370/252 |
| 2011/0310838 A1* | 12/2011 | Zheng | H04L 5/0048 370/330 |
| 2011/0317596 A1* | 12/2011 | Jongren | H04L 5/0053 370/280 |
| 2011/0317643 A1* | 12/2011 | Gaal | H04L 1/0029 370/329 |
| 2012/0039270 A1* | 2/2012 | Nguyen | H04J 11/003 370/329 |
| 2012/0093120 A1* | 4/2012 | Ko | H04B 7/0671 370/329 |
| 2012/0106501 A1* | 5/2012 | Kishiyama | H04L 1/0026 370/330 |
| 2012/0120882 A1* | 5/2012 | Luo | H04L 5/0053 370/329 |
| 2012/0147831 A1* | 6/2012 | Golitschek | H04L 1/0026 370/329 |
| 2012/0155423 A1* | 6/2012 | Kishiyama | H04B 7/0678 370/330 |
| 2012/0163335 A1* | 6/2012 | Chung | H04L 5/0023 370/330 |
| 2012/0188978 A1* | 7/2012 | Yan | H04W 72/042 370/330 |
| 2012/0269144 A1* | 10/2012 | Suzuki | H04L 5/0053 370/329 |
| 2012/0275530 A1* | 11/2012 | Nazar | H04B 7/022 375/267 |
| 2013/0070693 A1* | 3/2013 | Kwon | H04L 5/001 370/329 |
| 2013/0148620 A1 | 6/2013 | Nanri et al. | |
| 2013/0188558 A1* | 7/2013 | Nam | H04W 24/02 370/328 |
| 2013/0201975 A1* | 8/2013 | Chen | H04W 72/0446 370/336 |
| 2014/0286304 A1* | 9/2014 | Yoon | H04L 5/0007 370/330 |
| 2015/0063139 A1* | 3/2015 | Zhang | H04W 24/08 370/252 |
| 2015/0078289 A1* | 3/2015 | Kakishima | H04W 16/32 370/329 |

FOREIGN PATENT DOCUMENTS

| | | |
|---|---|---|
| JP | 2011-530233 A | 12/2011 |
| JP | 2013535134 A | 9/2013 |
| WO | 2011/122833 A2 | 10/2011 |
| WO | 2011156638 A2 | 12/2011 |
| WO | 2012/023230 A1 | 2/2012 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Office Action issued in corresponding Japanese Application No. 2012-087595, mailed May 10, 2016 (9 pages).
Office Action issued in the counterpart European Patent Application No. 13773100.6, mailed Oct. 8, 2015 (8 pages).
Samsung, et al.; "Uplink Transmission Scheme for E-UTRA TDD"; 3GPP TSG-RAN WG1 #43, R1-051379; Seoul, Korea; Nov. 7-11, 2005 (3 pages).
Office Action issued in the counterpart Japanese Patent Application No. 2012-087595, mailed Dec. 20, 2016 (15 pages).

* cited by examiner

|  | WIDE AREA | LOCAL AREA |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.4

COMMUNICATION SYSTEM, MOBILE TERMINAL APPARATUS, LOCAL AREA BASE STATION AND COMMUNICATION METHOD

TECHNICAL FIELD

The present invention relates to a communication system, a mobile terminal apparatus, a local area base station apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Furthermore, successor systems of LTE are also under study for the purpose of achieving further broadbandization and higher speed beyond LTE (referred to as, for example, "LTE-advanced" or "LTE enhancement" (hereinafter referred to as "LTE-A")). In LTE-A (Rel-10), carrier aggregation to make a broad band by grouping a plurality of component carriers (CCs), where the system band of the LTE system is one unit, is used. Also, in LTE-A, a HetNet (Heterogeneous Network) configuration to use an interference coordination technique, enhanced inter-cell interference coordination (eICIC), is under study.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of near-field communication supporting local areas such as indoors, shopping malls and so on, in addition to cellular environment such as given above, will be provided. Consequently, there is a demand to design new radio communication schemes that are specifically designed for local areas, so that capacity can be secured with local areas while coverage is secured with a wide area.

The present invention has been made in view of the above, and it is therefore an object of the present invention to provide a communication system, a mobile terminal apparatus, a local area base station apparatus, and a communication method that can provide highly efficient local area radio access.

Solution to Problem

The communication system of the present invention is a communication system in which a mobile terminal apparatus that can communicate with a wide area base station apparatus covering a wide area in a radio communication scheme for the wide area detects a local area base station apparatus which the mobile terminal apparatus will connect to, among local area base station apparatuses covering local areas, and in this communication system, a radio access scheme and a subframe configuration in a radio interface between the local area base station apparatuses and the mobile terminal apparatus is the same between the uplink and the downlink.

Advantageous Effects of Invention

According to the present invention, it is possible to provide highly efficient local area radio access that is specifically designed for local areas.

BRIEF DESCRIPTION OF DRAWINGS

FIG. 4 is a table to list differences between a wide area and a local area;

DESCRIPTION OF EMBODIMENTS

Figure 1:
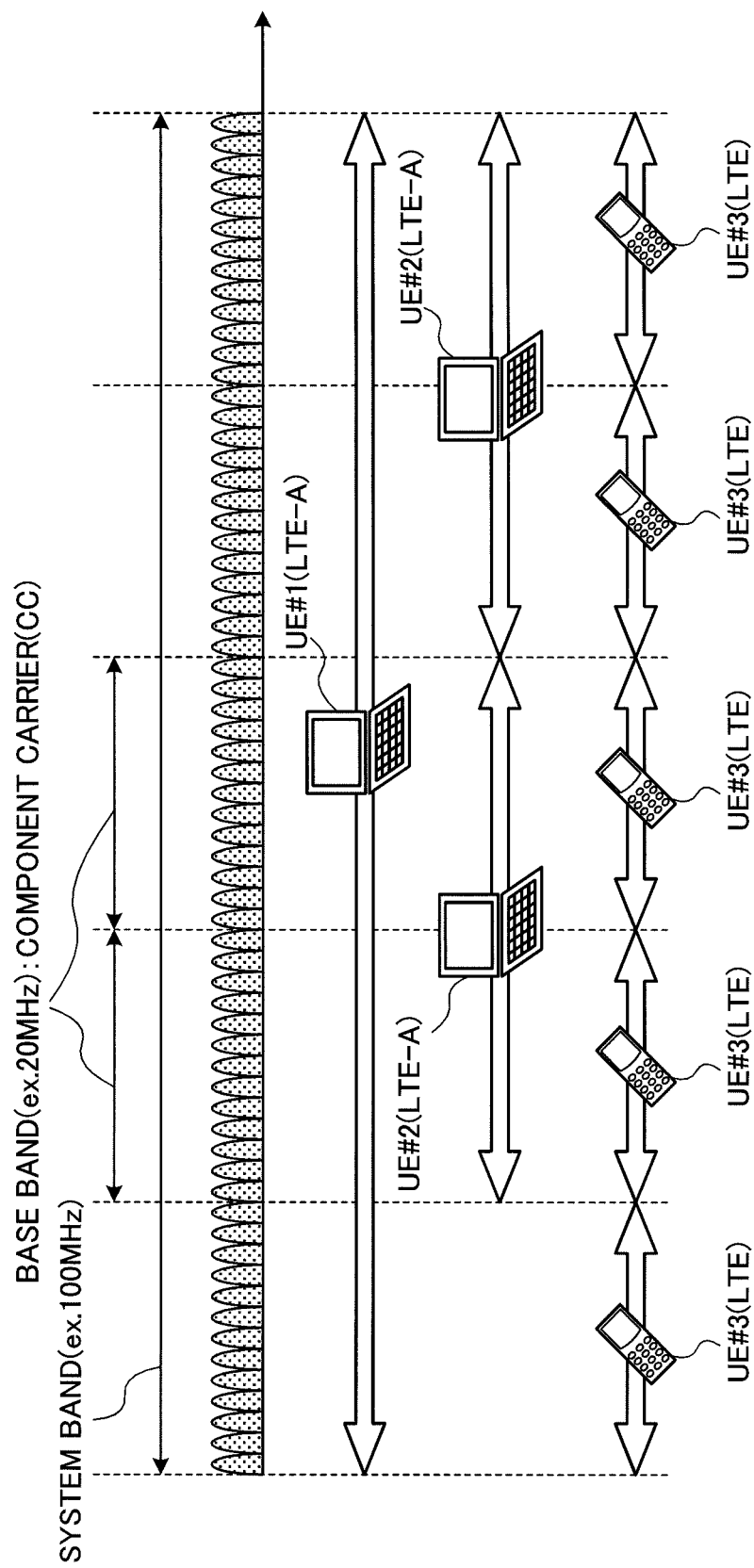
FIG. 1 is a diagram to explain a system band in an LTE system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not to support the LTE-A system), and is able to support a system band up to 20 MHz (base band).

Figure 2:
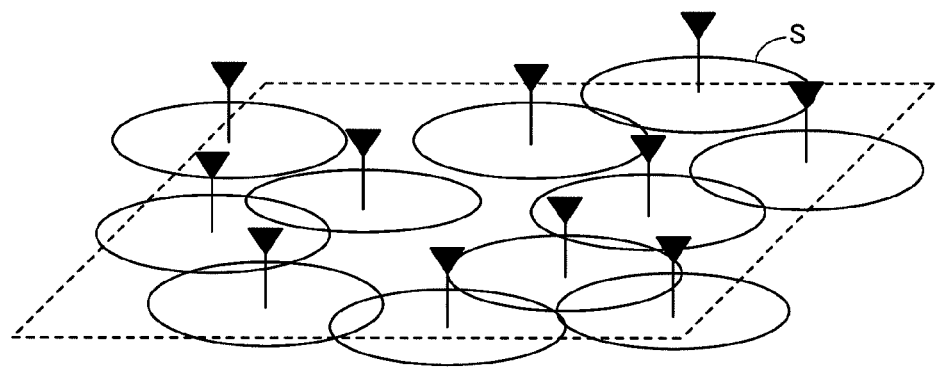
FIG. 2 is diagram to show a configuration to arrange many small cells in a macro cell.

Now, future systems may anticipate a configuration to arrange numerous small cell S's in a macro cell, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. Also, as demands apart from capacity, small cell S's are required to support saved power consumption on the mobile terminal apparatus side, random cell planning, and so on.

Figure 3A:
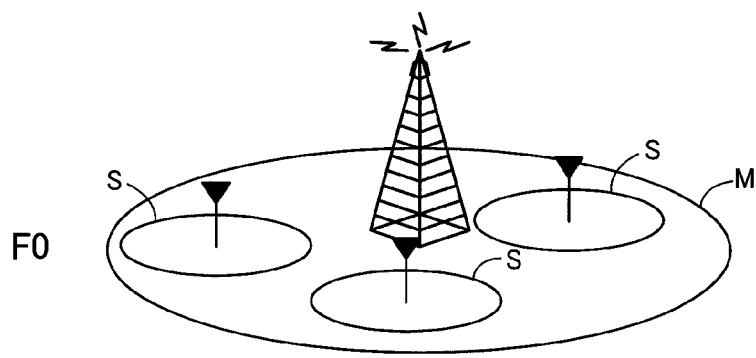
FIG. 3 provides diagrams to show two kinds of heterogeneous network configurations.
Figure 3B:
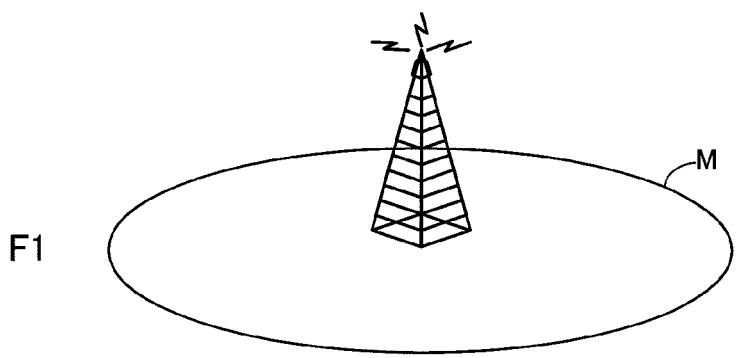
Figure 3B:
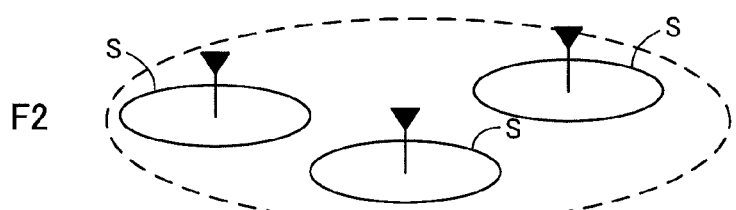

When small cell S's are arranged in a macro cell M, two kinds of heterogeneous network (hereinafter referred to as "HetNet") configurations may be possible, as shown in FIGS. 3A and 3B. In the first HetNet configuration shown in FIG. 3A, the small cells are arranged such that the macro cell M and the small cell S's use the same carrier. In the second HetNet configuration shown in FIG. 3B, the small cell S's are arranged such that the macro cell M and the small cell S's use different carriers. In the second HetNet configuration, the small cell S's use a dedicated carrier, so that it is possible to secure coverage with the macro cell M and secure capacity with the small cell S's. It is expected that, in the future (Rel. 12 and later versions), this second HetNet configuration will become more important.

As shown in FIG. 4, in the second HetNet configuration, varying demands and differences in configuration may exist between the wide area (macro cell) and the local areas (small cells). A wide area has a limited bandwidth, so that spectral efficiency is very important. By contrast with this, it is easy to take a wide bandwidth with local areas, so that if a wide bandwidth can be secured, the significance of spectral efficiency is not as high as in a wide area. While a wide area needs to support high mobility such as represented by cars and/or the like, a local area has only to support low mobility. A wide area needs to secure wide coverage. On the other hand, although it is preferable to secure wide coverage with a local area as well, a wide area can cover up the shortage of coverage.

Also, although, in a wide area, the uplink-downlink power difference is significant and the uplink and the downlink are asymmetrical, in local areas, the uplink-downlink power difference is insignificant and the uplink and the downlink are made nearly symmetrical. Furthermore, in a wide area, the number of connecting users per cell is high and cell planning is applied, so that there is little variation of traffic. By contrast with this, in a local area, the number of connecting users per cell is low, and furthermore there is a possibility that cell planning is not applied, so that there is significant variation of traffic. In this way, since optimal requirements for a local area are different from those of a wide area, it is necessary to design radio communication schemes that are specifically designed for local areas.

Figure 5:
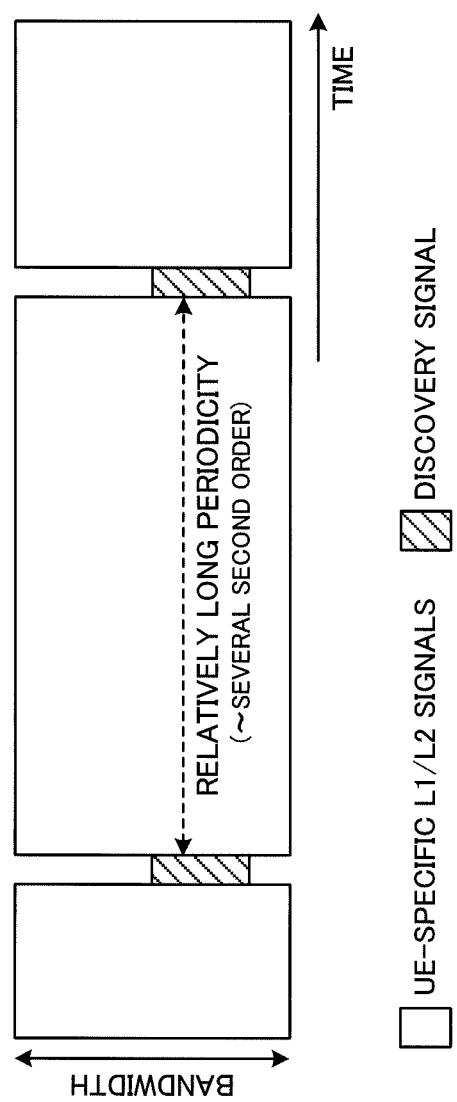
FIG. 5 is a diagram to show a local area radio communication scheme.

Considering interference that arises from saved power consumption and random cell planning, it is preferable to configure a radio communication scheme for local areas to assume non-transmission when there is no traffic. Consequently, as shown in FIG. 5, a radio communication scheme for local areas is expected to be designed as UE-specific as possible. Consequently, a radio communication scheme for local areas is designed based on ePDCCHs (enhanced Physical Downlink Control Channels) and DM-RSs (Demodulation-Reference Signals), without using PSSs/SSSs (Primary Synchronization Signals/Secondary Synchronization Signals), CRSs (Cell-specific Reference Signals), PDCCHs (Physical Downlink Control Channels) and so on in LTE.

Here, an ePDCCH refers to a predetermined frequency band that lies within the PDSCH region (data signal region) and that is used as a PDCCH region (control signal region). EPDCCHs allocated in the PDSCH region are demodulated using DM-RSs. Note that ePDCCH may be referred to as "FDM-type PDCCH" or may be referred to as "UE-PDCCH." Also, in a radio communication scheme for local areas, a new carrier that is different from existing carriers is used, and this new carrier may be referred to as an additional carrier or may be referred to as an extension carrier. Note that, in FIG. 5, the PDSCH (Physical Downlink Shared Channel), ePDCCHs, DM-RSs and so on are shown as UE-specific L1/L2 signals.

When everything is designed UE-specific in a radio communication scheme for local areas, a mobile terminal apparatus cannot have the opportunity to make initial access to the local areas. Consequently, in a radio communication scheme for local areas, too, it is necessary to provide cell-specific synchronization signals. The synchronization signals are transmitted in a relatively long cycle on the order of several seconds, so that the mobile terminal apparatus can save battery. The mobile terminal apparatus recognizes the times to receive synchronization signals from each local area by means of control information from the wide area, and measures each local area's received signal power at these times of reception. The mobile terminal apparatus is assigned an adequate local area (transmission point) in accordance with the received signal power of synchronization signals.

Now, with the above HetNet configuration, there is a problem that the wide area and the local area need to be coordinated and that the procedures which a mobile terminal apparatus has to take to establish connection with the local area on the uplink are complex. So, the present inventors have arrived at the present invention in order to make initial access on the uplink simple, in a local area that is designed UE-specific. That is, a gist of the present invention is to make initial access simple by providing an uplink channel for reporting synchronization signal measurement results, and establish uplink connection quickly after traffic is produced in a mobile terminal apparatus.

Figure 6:
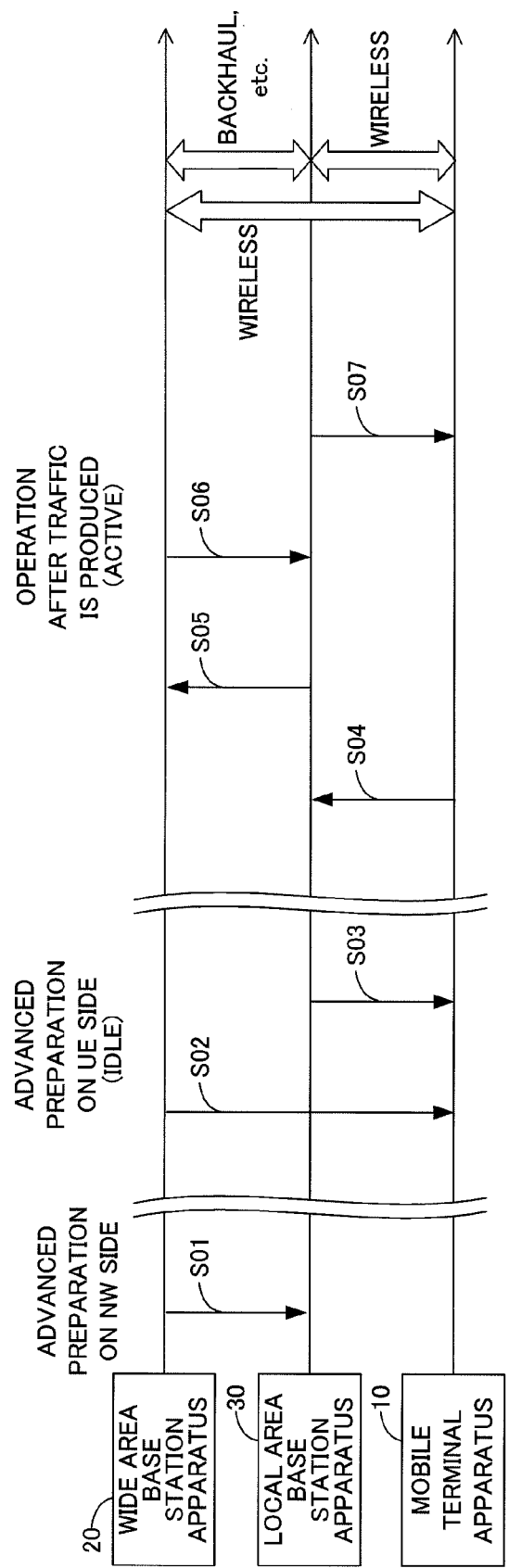
FIG. 6 is a sequence diagram to show an initial connection scheme using a DACH arrangement configuration.

Now, an uplink channel for local areas and an initial connection scheme to use this uplink channel will be described below with reference to FIG. 6. Note that, in the following description, in the radio communication scheme for local areas, synchronization signals for the local area will be referred to as "discovery signals." Also, in the radio communication scheme for local areas, the uplink channel that is defined for reporting discovery signal measurement results will be referred to as "DACH" (Direct Access Channel).

Note that the discovery signal may be referred to as, for example, PDCH (Physical Discovery Channel), BS (Beacon Signal), DPS (Discovery Pilot Signal) and so on. Also, DACH is not limited to a particular name. The radio communication scheme may be referred to as "radio interface" or may be referred to as "radio interface scheme." The wide area may be a macro cell, a sector and/or the like. The local area may be a small cell, a pico cell, a nano cell, a femto cell, a micro cell and so on, and may be provided indoors as well as outdoors.

In the radio communication scheme for the local areas, discovery signals are transmitted in a long cycle so that a mobile terminal apparatus is able to reduce the number of times of measurement and save battery. In a DACH arrangement configuration, while downlink discovery signals are transmitted in a long cycle, radio resources are allocated to uplink DACH with comparatively high frequency (in a short cycle). By means of this DACH used with high frequency, uplink connection is established quickly when traffic is produced in a mobile terminal apparatus. Now, an initial connection scheme to use the DACH arrangement configuration will be described below in detail.

An example of the initial connection scheme to use the DACH arrangement configuration will be described with reference to FIG. 6. Note that, in the following description, a configuration to arrange a plurality of local areas in a wide area will be exemplified (see FIG. 10 mentioned below). As shown in FIG. 6, a wide area base station apparatus 20 and each local area base station apparatus 30 are connected by means of a backhaul link and/or the like (for example, an X2 interface), and a mobile terminal apparatus 10 is able to receive radio signals from the wide area and each local area.

For advanced preparation on the network side, each local area base station apparatus 30 receives control information for discovery signal transmission from the wide area base station apparatus 20, via a backhaul link, and transmits discovery signals periodically (step S01). The control information for discovery signal transmission includes, for example, radio resource information and signal sequence information for transmitting discovery signals to the mobile terminal apparatus 10. Note that the signal sequence of the discovery signal is set for each local area, and the local areas are identified by this signal sequence.

Next, in an idle state, the mobile terminal apparatus 10 receives control information for discovery signal reception, control information for DACH transmission, and control information for ePDCCH reception, from the wide area base station apparatus 20 (step S02). The control information for discovery signal reception includes, for example, radio resource information and signal sequence information for receiving discovery signals from each local area base station apparatus 30. The control information for DACH transmission includes, for example, radio resource information and DM-RS sequence information for transmission to the local area base station apparatus 30 through the DACH. The control information for ePDCCH reception includes, for example, radio resource information and DM-RS sequence information for reception from the local area base station apparatus 30 through ePDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S03). Then, traffic is produced in the mobile terminal apparatus 10, and the mobile terminal apparatus 10 shifts from an idle state to an active state.

Upon the shift to an active state, the discovery signal measurement results and user IDs of the top several stations among a plurality of local area base station apparatuses 30 are transmitted from the mobile terminal apparatus 10 to the nearest local area base station apparatus 30 through the DACH (step S04). In this case, by means of the control information for DACH transmission received from the wide area base station apparatus 20 in step S02, the mobile terminal apparatus 10 is prepared in advance for transmission using the DACH. Note that the mobile terminal apparatus 10 may determine the nearest local area base station apparatus 30 based on the magnitude of the received signal power of the discovery signals (for example, based on the highest received signal power). Also, the user IDs may be IDs that are randomly selected by the mobile terminal apparatus 10 (for example, RACH-IDs).

Next, the discovery signal measurement results and user IDs of the top several stations, received from the mobile terminal apparatus 10, are transferred from the nearest local area base station apparatus 30 to the wide area base station apparatus 20 (step S05). The wide area base station apparatus 20 assigns an adequate local area base station apparatus to the mobile terminal apparatus 10 based on the discovery signal measurement results of the top several stations, and sets the initial downlink transmission power in the local area base station apparatus 30 (step S06). At this time, the wide area base station apparatus 20 adjusts the load balance between the local areas and assigns the local area base station apparatus 30 to the mobile terminal apparatus 10. Consequently, the mobile terminal apparatus 10 is not necessarily assigned the local area base station apparatus 30 of the highest received signal power. Also, the wide area base station apparatus 20 may be configured to assign a plurality of local area base station apparatuses 30 to the mobile terminal apparatus 10 and carry out CoMP (Coordinated Multiple Point) transmission.

Then, from the assigned local area base station apparatus 30 to the mobile terminal apparatus 10, downlink control signals are transmitted through a control channel (ePDCCH) and user data is transmitted through a data channel (PDSCH) (step S07). In this case, by means of the control information for ePDCCH reception received from the wide area base station apparatus 20 in step S02, the mobile terminal apparatus 10 is prepared in advance for reception using ePDCCHs.

With this initial connection scheme, discovery signal measurement results are reported to the local area base station apparatus 30 through the DACH that is defined in the radio communication scheme for the local area. Consequently, it is possible to establish uplink connection between the mobile terminal apparatus 10 and the local area base station apparatus 30 without transmitting uplink signals from the mobile terminal apparatus 10 to the wide area base station apparatus 20. Also, since the mobile terminal apparatus 10 measures the discovery signals in an idle state in advance, the uplink connection after shift to an active state is made quickly. Furthermore, discovery signal measurement results are reported after the mobile terminal apparatus 10 shifts to the active state, so that it is possible to reduce the frequency of reporting and save the battery of the mobile terminal apparatus 10.

Note that, although the initial connection scheme described above is configured to measure the received signal power of discovery signals, this configuration is by no means limiting. With each of the above initial connection scheme, it is equally possible to measure the received quality of discovery signals and determine the local area base station apparatus 30 to connect the mobile terminal apparatus 10 to.

Here, the symmetry of the uplink and the downlink in the local area will be described. As described above, the uplink-downlink power difference is insignificant in the local area, and this allows the uplink and the downlink to become nearly symmetrical. Considering a tendency like this, the present inventors have studied the symmetry of the uplink and the downlink in the local area from the viewpoint of radio interface.

In LTE-A systems up to Rel. 11, as a radio access scheme, OFDMA (Orthogonal Frequency Division Multiple Access) is applied to the downlink, and SC-FDMA (Single-Carrier Frequency Division Multiple Access) is applied to the uplink. That is, OFDMA is not adopted in the uplink.

In the second HetNet configuration in which small cell S's use a dedicated carrier, as shown in FIG. 3B, since there is no interference from the wide area (macro cell) to the local area, regions with high SINR become important in radio communication. In the regions with high SINR, OFDMA is suitable in the aspect of performance. Considering that the uplink and the downlink are made nearly symmetrical in local areas, it may be preferable to also apply OFDMA to the uplink so that the same radio access scheme is used between the uplink and the downlink.

Figure 7A:
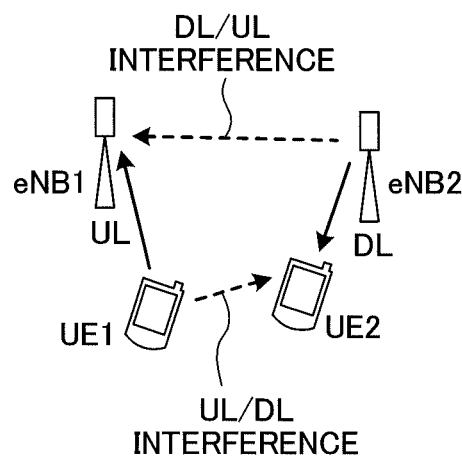
FIG. 7 provides diagrams to explain the symmetry in the uplink and the downlink.

In this way, by making the radio access scheme the same between the uplink and the downlink, it becomes suitable for, for example, dynamic TDD (dynamic Time Division Duplex) which changes the uplink and the downlink dynamically. As shown in FIG. 7A, in dynamic TDD at a given point in time, the uplink is used for communication between one base station apparatus eNB 1 and one mobile terminal apparatus UE 1 which communicates with the base station apparatus eNB 1, and the downlink is used for communication between another base station apparatus eNB 2 and another mobile terminal apparatus UE 2 which communicates with the base station apparatus eNB 2. In this case, in the base station apparatus eNB 1, it is desirable to cancel interference (DL/UL interference) by the downlink signal from the base station apparatus eNB 2 to the mobile terminal apparatus UE 2 when the uplink signal from the mobile terminal apparatus UE 1 is received. Also, in the mobile terminal apparatus UE 2, it is desirable to cancel interference (UL/DL interference) by the uplink signal from the mobile terminal apparatus UE 1 to the base station apparatus eNB 1 when the downlink signal from the base station apparatus eNB 2 is received.

Cancellation of DL/UL interference or UL/DL interference such as above may be effectively realized by not only making the radio access scheme the same between uplink and downlink but by also making the subframe configuration including reference signals the same between uplink and downlink.

So, in view of the above, the present inventors arrived at the present invention upon finding out that, by making the radio access scheme the same between uplink and downlink, and by also making the subframe configuration signals the same between uplink and downlink, it is possible to enhance the symmetry between the uplink and the downlink and improve system throughput in HetNet configuration where the small cell S's use a dedicated carrier.

Figure 7B:
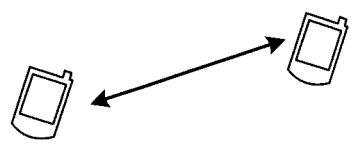

Such radio interface to make the radio access scheme the same between the uplink and the downlink and also make the subframe configuration the same between the uplink and the downlink is suitable for communication between devices where the mobile terminal apparatus supports both downlink transmission and uplink reception (see FIG. 7B).

Figure 8A:
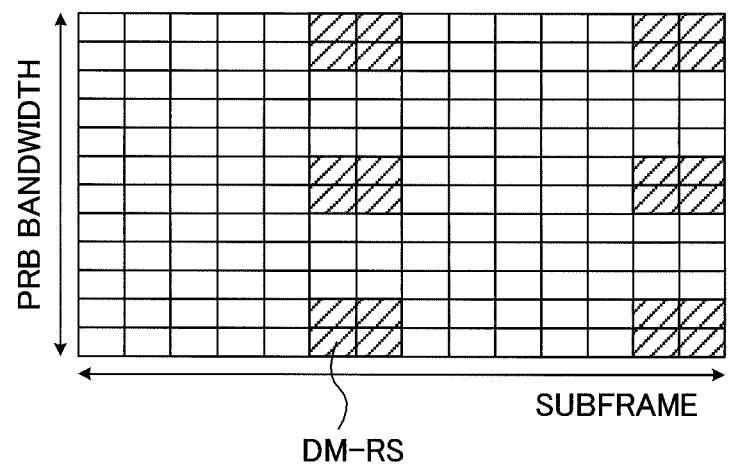
FIG. 8 provides diagrams to show a configuration of a demodulation reference signal.
Figure 8B:
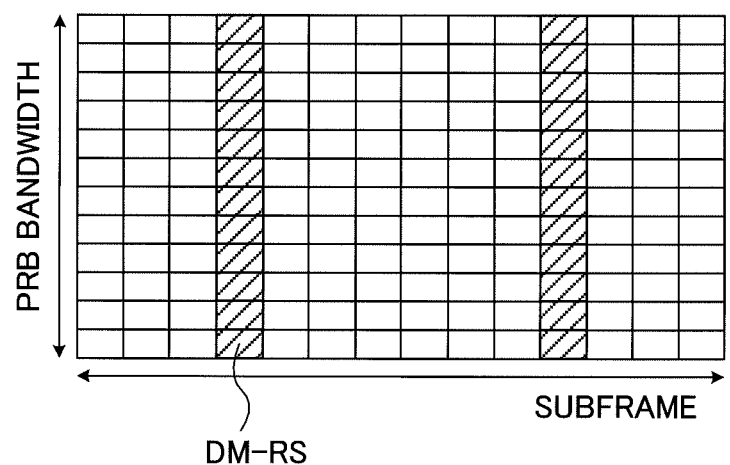

Here, combinations of radio access schemes and subframe configurations (reference signal configurations) will be described. In the LTE-A system of Rel. 11, for a radio access scheme, OFDMA is adopted on the downlink, and SC-FDMA is adopted on the uplink. Also, as a reference signal configuration, the DM-RS (Demodulation Reference Signal) configuration illustrated in FIG. 8A is applied to the downlink, and the DM-RS configuration illustrated in FIG. 8B is applied to the uplink.

In the HetNet configuration where the small cell S's use a dedicated carrier, while the radio access scheme is made the same between the uplink and the downlink, the following four can be represented as combinations to make the subframe configurations (subframe configurations including DM-RS) the same between the uplink and the downlink:

(1) radio access scheme: OFDMA, reference signal configuration: downlink DM-RS;

(2) radio access scheme: SC-FDMA, reference signal configuration: uplink DM-RS;

(3) radio access scheme: OFDMA, reference signal configuration: uplink DM-RS; and (4) radio access scheme: SC-FDMA, reference signal configuration: downlink DM-RS.

Among the four combinations above, the radio interface to apply the combination of the OFDMA radio access scheme and the uplink DM-RS reference signal configuration to the uplink and the downlink is preferable. By applying such radio interface, it is possible to mutually orthogonalize DM-RSs between radio links by using an uplink DM-RS orthogonalization method (cyclic shift (CS) or an orthogonal cover code (OCC)). That is, ULDM-RSs, DLDM-RSs, and ULDM-RSs and DLDM-RSs can be orthogonalized.

Figure 9A:
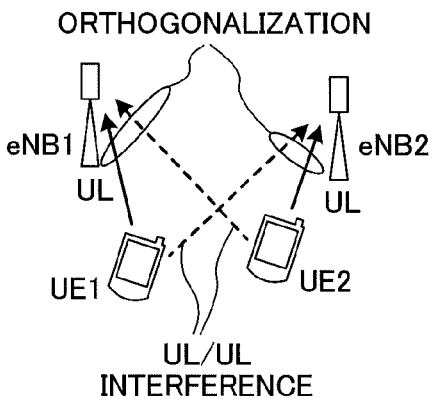
FIG. 9 provides diagrams to explain cancellation of radio link interference.
Figure 9B:
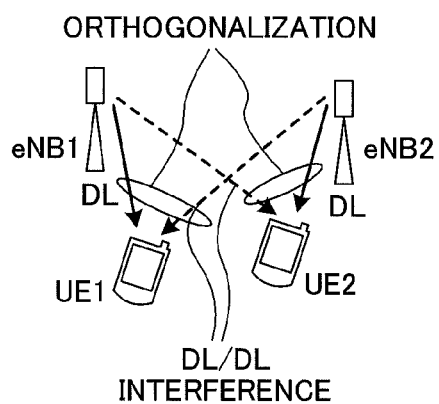
Figure 9C:
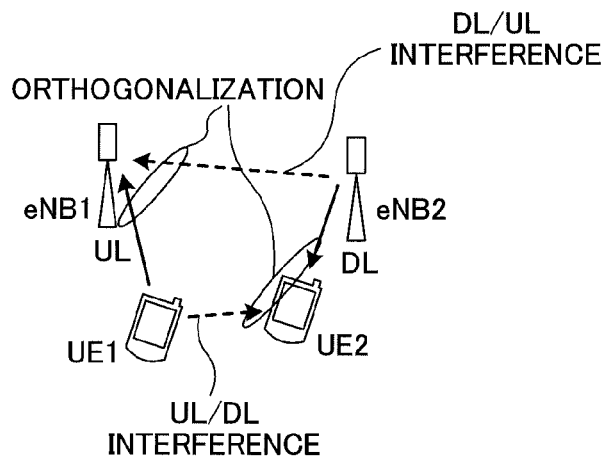

For example, when the radio interface to apply the combination of the OFDMA radio access scheme and the uplink DM-RS reference signal configuration to the uplink and the downlink, it is possible to mutually orthogonalize DM-RS between radio links in any cases illustrated in FIG. 9A to FIG. 9C. That is, since it is possible to mutually orthogonalize DM-RS between radio links, in the case illustrated in FIG. 9A, the base station apparatus eNB 1, when receiving uplink signals from the mobile terminal apparatus UE1, can cancel interference (UL/UL interference) by uplink signals from the mobile terminal apparatus UE 2 to the base station apparatus eNB 2, and the base station apparatus eNB 2, when receiving uplink signals from the mobile terminal apparatus UE 2, can cancel interference (UL/UL interference) by uplink signals from the mobile terminal apparatus UE 1 to the base station apparatus eNB 1.

Also, in the case illustrated in FIG. 9B, the mobile terminal apparatus UE 1, when receiving downlink signals from the base station apparatus eNB 1, can cancel interference (DL/DL interference) by downlink signals from the base station apparatus eNB 2 to the mobile terminal apparatus UE 2, and the mobile terminal apparatus UE 2, when receiving downlink signals from the base station apparatus eNB 2, can cancel interference (DL/DL interference) by downlink signals from the base station apparatus eNB 1 to the mobile terminal apparatus UE 1.

In the case illustrated in FIG. 9C, the base station apparatus eNB 1, when receiving uplink signals from the mobile terminal apparatus UE 1, can cancel interference (DL/UL interference) by the downlink signal from the base station apparatus eNB 2 to the mobile terminal apparatus UE 2, and the mobile terminal apparatus UE 2, when downlink signals from the base station apparatus eNB 2 is received, can cancel interference (UL/DL interference) by uplink signals from the mobile terminal apparatus UE1 to the base station apparatus eNB 1.

Note that when the radio interface to apply the combination of the OFDMA radio access scheme and the uplink DM-RS reference signal configuration between the uplink and the downlink is applied, a function to assign a DM-RS orthogonalization principle (CS, OCC) to the downlink is necessary, and, for example, it may be possible to add bits to assign the DM-RS orthogonalization method (CS, OCC) (bits to assign the current uplink DM-RS orthogonalization method (CS, OCC)) is added to downlink control information (DCI). In this way, by adding a bit to assign the DM-RS orthogonalization method (CS, OCC) to the downlink control information (DCI), that is, by combining downlink resource allocation information and the downlink DM-RS orthogonalization method, it is possible to standardize formats to notify control information.

In this way, in the communication system of the present invention, the radio access scheme and the subframe configuration in the radio interface between the local area base station apparatuses and the mobile terminal apparatus is the same between the uplink and the downlink. That is, the mobile terminal apparatus receives downlink signals from the local area base station apparatus by the radio access scheme for the local area and by the subframe configuration for the local area, and transmits uplink signals to the local area base station apparatus by the same radio access scheme as in the downlink and by the same subframe configuration as in the downlink.

Also, the local area base station apparatuses transmit downlink signals to the mobile terminal apparatus by the radio access scheme for the local areas and by the subframe configuration for the local areas, and receive uplink signals as in the downlink from the mobile terminal apparatus by the same radio access scheme and by the same subframe configuration as in the downlink.

According to the communication system like this, it is possible to provide highly efficient local area radio access specifically designed for the local area. In particular, since the radio access scheme and the subframe configuration are made the same between the uplink and the downlink to enhance the symmetry between the uplink and the downlink, this system is effective in dynamic TDD and/or communication between devices.

Figure 10:
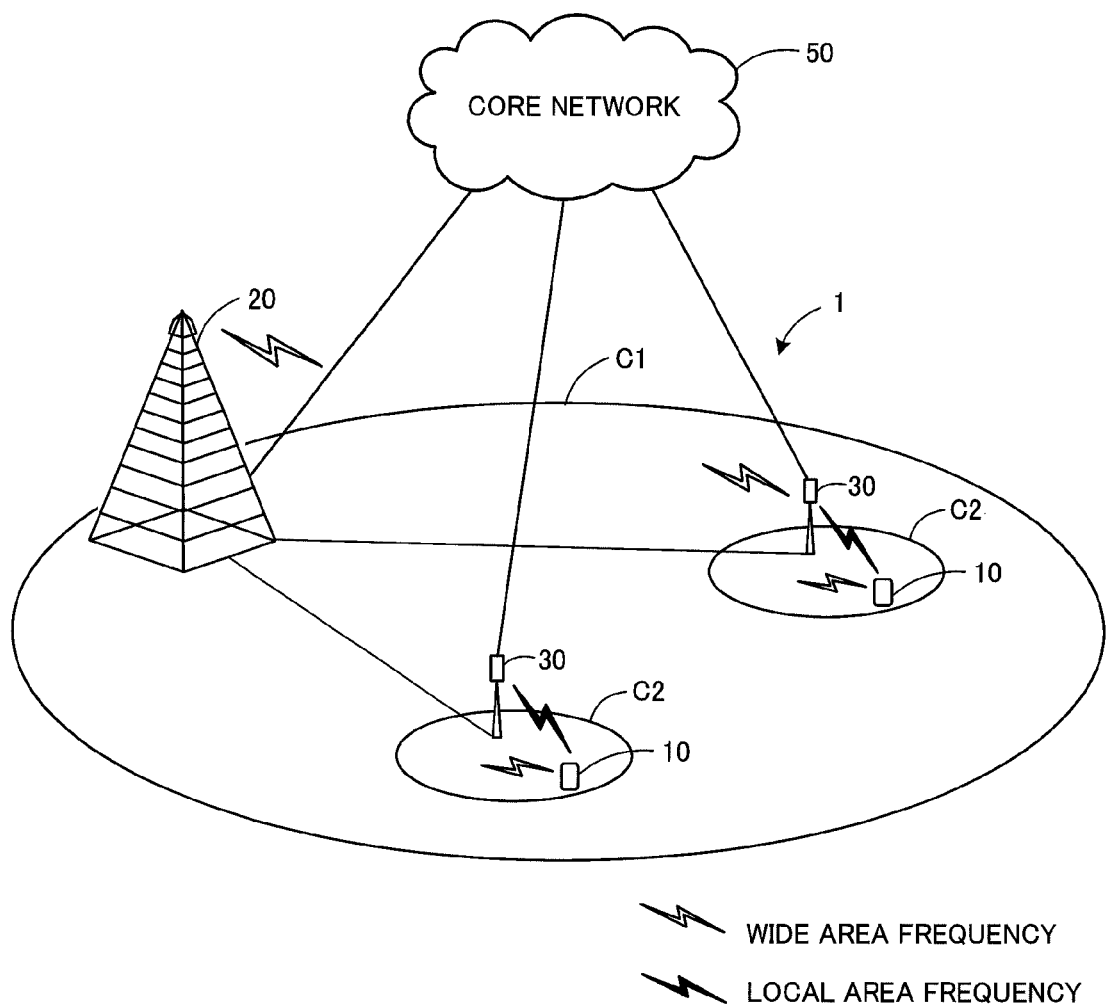
FIG. 10 is a diagram to explain a system configuration of a radio communication system.

Now, a radio communication system according to the present embodiment will be described in detail. FIG. 10 is a diagram to explain a system configuration of a radio communication system according to the present embodiment. Note that the radio communication system shown in FIG. 10 is a system to accommodate, for example, the LTE system or SUPER 3G. This radio communication system supports carrier aggregation to group a plurality of fundamental frequency blocks into one, where the system band of the LTE system is one unit. Also, this radio communication system may be referred to as "IMT-Advanced," or may be referred to as "4G," "FRA" (Future Radio Access) and so on.

As shown in FIG. 10, the radio communication system 1 has a wide area base station apparatus 20 that covers a wide area C1, and a plurality of local area base station apparatuses 30 that cover a plurality of local areas C2 provided inside the wide area C1. Also, in the wide area C1 and each local area C2, many mobile terminal apparatuses 10 are placed. The mobile terminal apparatuses 10 support the radio communication scheme for the wide area and the local areas, and are configured to be able to perform radio communication with the wide area base station apparatus 20 and the local area base station apparatuses 30.

Communication between the mobile terminal apparatuses 10 and the wide area base station apparatus 20 is carried out using the frequency for the wide area (for example, a low frequency band). Communication between the mobile terminal apparatuses 10 and the local area base station apparatuses 30 is carried out using the frequency for the local areas (for example, a high frequency band). Also, the wide area base station apparatus 20 and each local area base station apparatus 30 are connected with each other by wire connection or by wireless connection.

The wide area base station apparatus 20 and each local area base station apparatus 30 are connected with a higher station apparatus, which is not illustrated, and are connected to a core network 50 via the higher station apparatus. Note that the higher station apparatus may be, for example, an access gateway apparatus, a radio network controller (RNC), a mobility management entity (MME) and so on, but is by no means limited to these. Also, the local area base station apparatuses 30 may be connected with the higher station apparatus via the wide area base station apparatus 20.

Note that, although each mobile terminal apparatus 10 may be either an LTE terminal or an LTE-A terminal, in the following description, simply a mobile terminal apparatus will be described, unless specified otherwise. Also, although the mobile terminal apparatus will be described to perform radio communication with the wide area base station apparatus 20 and the local area base station apparatuses 30 for ease of explanation, more generally, user equipment (UE), including both mobile terminal apparatuses and fixed terminal apparatuses, may be used as well. Also, the local area base station apparatuses 30 and the wide area base station apparatus 20 may be referred to as wide area and local area transmission points. Note that the local area base station apparatuses 30 may be a remote optical base station apparatus.

In the radio communication system, as a radio access scheme, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands. Note that, with the present invention, in the local area, as a radio access scheme, OFDMA (Orthogonal Frequency Division Multiple Access) is applied to both the uplink and the downlink.

Here, communication channels in the LTE system will be described. Downlink communication channels include a PDSCH (Physical Downlink Shared Channel), which is used by each mobile terminal apparatus 10 on a shared basis, and the downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each mobile terminal apparatus 10 on a shared basis as an uplink data channel, and a PUCCH (Physical Uplink Control Channel), which is an uplink control channel. User data and higher control information are transmitted by this PUSCH.

Also, downlink radio quality information (CQI: Channel Quality Indicator), ACK/NACK and so on are transmitted by the PUCCH.

In the present invention, in the local area, the subframe configuration is the same between the uplink and the downlink. Here, the subframe configuration has a DM-RS configuration (uplink DM-RS configuration in the LTE-A system of Rel. 11) as shown in FIG. 8B.

Figure 11:
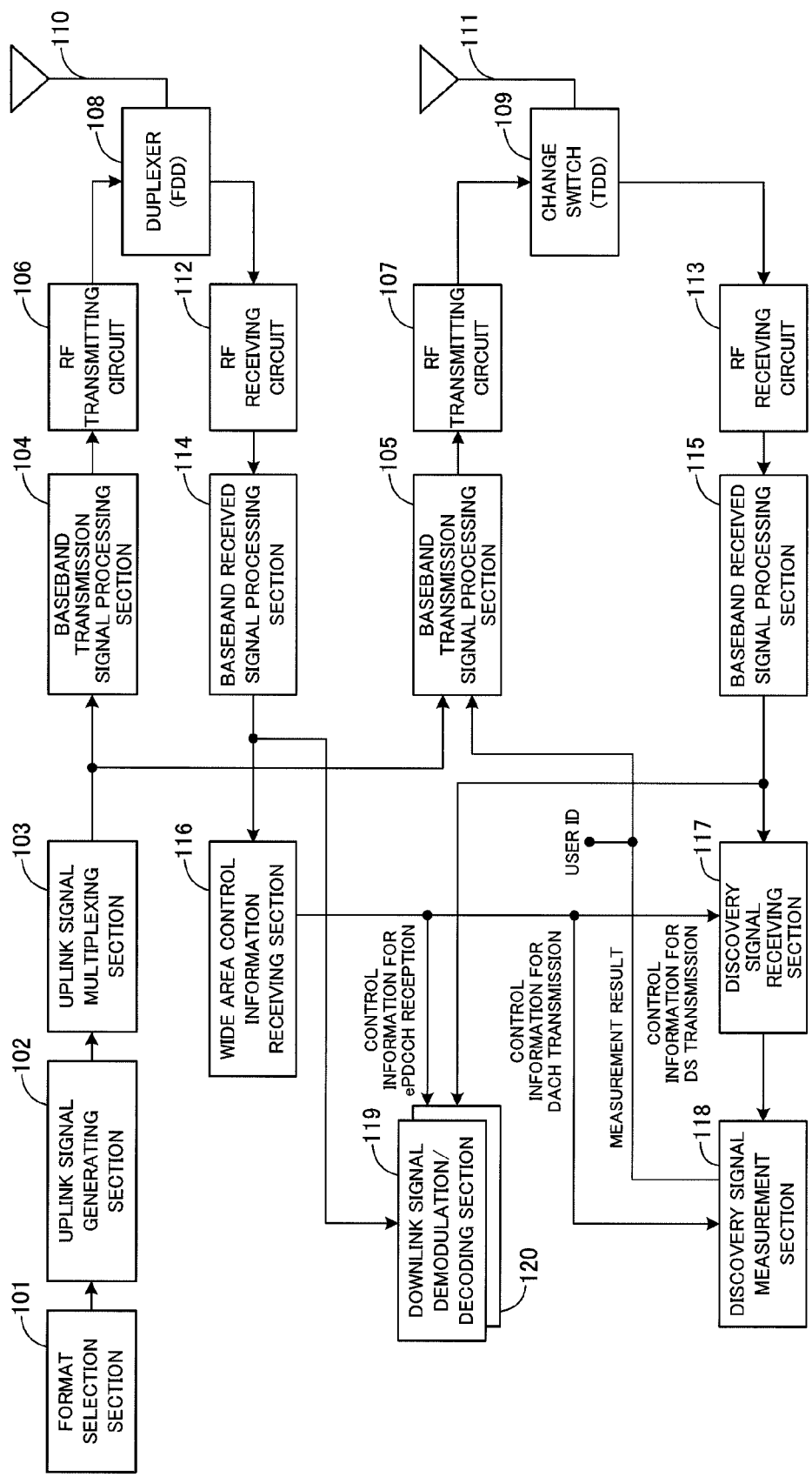
FIG. 11 is a diagram to explain an overall configuration of a mobile terminal apparatus.

Overall configurations of a mobile terminal apparatus 10 will be described with reference to FIG. 11. The mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects a transmission format for a wide area and a transmission format for local area. The uplink signal generating section 102 generates uplink data signals, reference signals, and control signals. In the case of the transmission format for the wide area, the uplink signal generating section 102 generates the uplink data signal and reference signal for the wide area base station apparatus 20. Also, in the case of the transmission format for the local areas, the uplink signal generating section 102 generates the uplink data signal, reference signal and the uplink control signal for the local area base station apparatus 30.

The uplink signal multiplexing section 103 multiplexes the uplink transmission data and the reference signals. The uplink signal multiplexing section 103 multiplexes by a DM-RS configuration illustrated in FIG. 8B. An uplink signal for the wide area base station apparatus 20 is input in the baseband transmission signal processing section 104, and subjected to digital signal processing. For example, in the case of an uplink signal of the OFDMA scheme, the, signal is converted from a frequency domain signal into a time sequence signal through an inverse fast Fourier transform (IFFT), and has cyclic prefixes inserted therein.

Also, in the baseband transmission signal processing section 104, cyclic shift process and/or block spreading process is executed for DM-RS.

In this way, the uplink DM-RS and/or the downlink DM-RS is orthogonalized. By this means, the uplink DM-RS can be orthogonalized. Consequently, it is possible to cancel UL/UL interference in the transmission mode in FIG. 9A or DL/UL interference in the transmission mode in FIG. 9C.

Then, the uplink signal passes the RF transmitting circuit 106, and is transmitted from a transmitting/receiving antenna 110 for the wide area, via a duplexer 108 that is provided between the transmitting sequence and the receiving sequence. In the transmitting/receiving sequences for the wide area, simultaneous transmission/reception is made possible by the duplexer 108.

An uplink signal for the local area base station apparatus 30 is input in the baseband transmission signal processing section 105, and subjected to digital signal processing. For example, in the case of an uplink signal of the OFDMA scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 111 for the wide area, via a change switch 109 that is provided between the transmitting sequence and the receiving sequence. In the transmitting/receiving sequences for the local areas, transmission and reception are switched by a change switch 109.

Note that, although the present embodiment is configured to provide the duplexer 108 in the transmitting/receiving sequences for the wide area and provide the change switch 109 in the transmitting/receiving sequences for the local areas, this configuration is by no means limiting. It is equally possible to provide the change switch 109 in the wide area transmitting/receiving sequences and provide the duplexer 108 in the local area transmitting/receiving sequences. Also, the uplink signals for the wide area and the local areas may be transmitted simultaneously from the transmitting/receiving antennas 110 and 111, or may be transmitted separately by switching between the transmitting/receiving antennas 110 and 111.

Also, the mobile terminal apparatus 10 provides, as processing sections of the receiving sequence, RF receiving circuits 112 and 113, baseband received signal processing sections 114 and 115, a wide area control information receiving section 116, a discovery signal receiving section 117, a discovery signal measurement section 118, and downlink signal demodulation/decoding sections 119 and 120.

A downlink signal from the wide area base station apparatus 20 is received at the wide area transmitting/receiving antenna 110. This downlink signal is input in the baseband received signal processing section 114 via the duplexer 108 and the RF receiving circuit 112, and subjected to digital signal processing. For example, in the case of a downlink signal of the OFDM scheme, the cyclic prefixes are removed, and the signal is converted from a time sequence signal to a frequency domain signal through a fast Fourier transform (FFT).

The wide area control information receiving section 116 receives wide area control information from the downlink signal for the wide area. Here, as the wide area control information, control information for discovery signal reception, control information for DACH transmission, and control information for ePDCCH reception are received. The wide area control information receiving section 116 outputs the control information for discovery signal reception to the discovery signal receiving section 117, outputs the control information for DACH transmission to the discovery signal measurement section 118, and outputs the control information for ePDCCH reception to the downlink signal demodulation/decoding section 120. Note that the wide area control information is received by means of, for example, broadcast information, RRC signaling (higher layer signaling) and so on. The downlink data signal for the wide area is input in the downlink signal demodulation/decoding section 119 and decoded (descrambled) and demodulated in the downlink signal demodulation/decoding section 119.

A downlink signal from the local area base station apparatus 30 is received in the transmitting/receiving antenna 111 for the local areas. The downlink signal is input in the baseband received signal processing section 115 via the change switch 109 and the RF receiving circuit 113, and is subjected to digital signal processing. For example, in the case of a downlink signal of the OFDMA scheme, the cyclic prefixes are removed, and the signal is converted from a time sequence signal to a frequency domain signal through a fast Fourier transform (FFT).

The discovery signal receiving section 117 receives the discovery signal from the local area base station apparatus 30 based on the control information for discovery signal reception input from the wide area control information receiving section 116. The control information for discovery signal reception includes, for example, radio resource information and signal sequence information for receiving discovery signals from each local area base station apparatus 30. The radio resource information includes, for example, the transmission interval, the frequency position, and the code of the discovery signals.

The discovery signal measurement section 118 periodically measures the received signal power of the discovery signals received in the discovery signal receiving section 117. Among the discovery signals from each local area base station apparatus 30, the discovery signal measurement section 118 transmits the measurement results of the top several stations (for example, the top three stations) where the received signal power is high, to the local area base station apparatus 30 by means of the DACH. In this case, the discovery signal measurement section 118 specifies the local area of the transmission destination based on the signal sequence of discovery signals. Also, in the case of the DACH arrangement configuration (the initial connection scheme), the DACH is set with higher frequency than the discovery signals. Then, upon shift from an idle state to an active state, the discovery signal measurement results are transmitted to the local area base station apparatus 30.

Note that transmission by means of the DACH is carried out based on the control information for DACH transmission input from the wide area control information receiving section 116. The control information for DACH transmission includes, for example, radio resource information and DM-RS sequence information for transmission to the local area base station apparatus 30 by means of the DACH. The radio resource information includes, for example, the transmission interval, the frequency position, and the code of the DACH.

A downlink data signal for the local areas is input in a downlink signal demodulation/decoding section 120, and decoded (descrambled) and demodulated in the downlink signal demodulation/decoding section 120. Also, based on the control information for ePDCCH reception input from the wide area control information receiving section 116, the downlink signal demodulation/decoding section 120 decodes (descrambles) and demodulates the local area downlink control signal (ePDCCH). The control information for ePDCCH reception includes, for example, radio resource information and DM-RS sequence information for reception from the local area base station apparatus 30 by means of ePDCCHs. The radio resource information includes, for example, the transmission interval, the frequency position, and the code of ePDCCHs.

Also, downlink signals for the wide area and the local areas may be transmitted simultaneously from the transmitting/receiving antennas 110 and 111, or may be transmitted separately by switching between the transmitting/receiving antennas 110 and 111.

Figure 12:
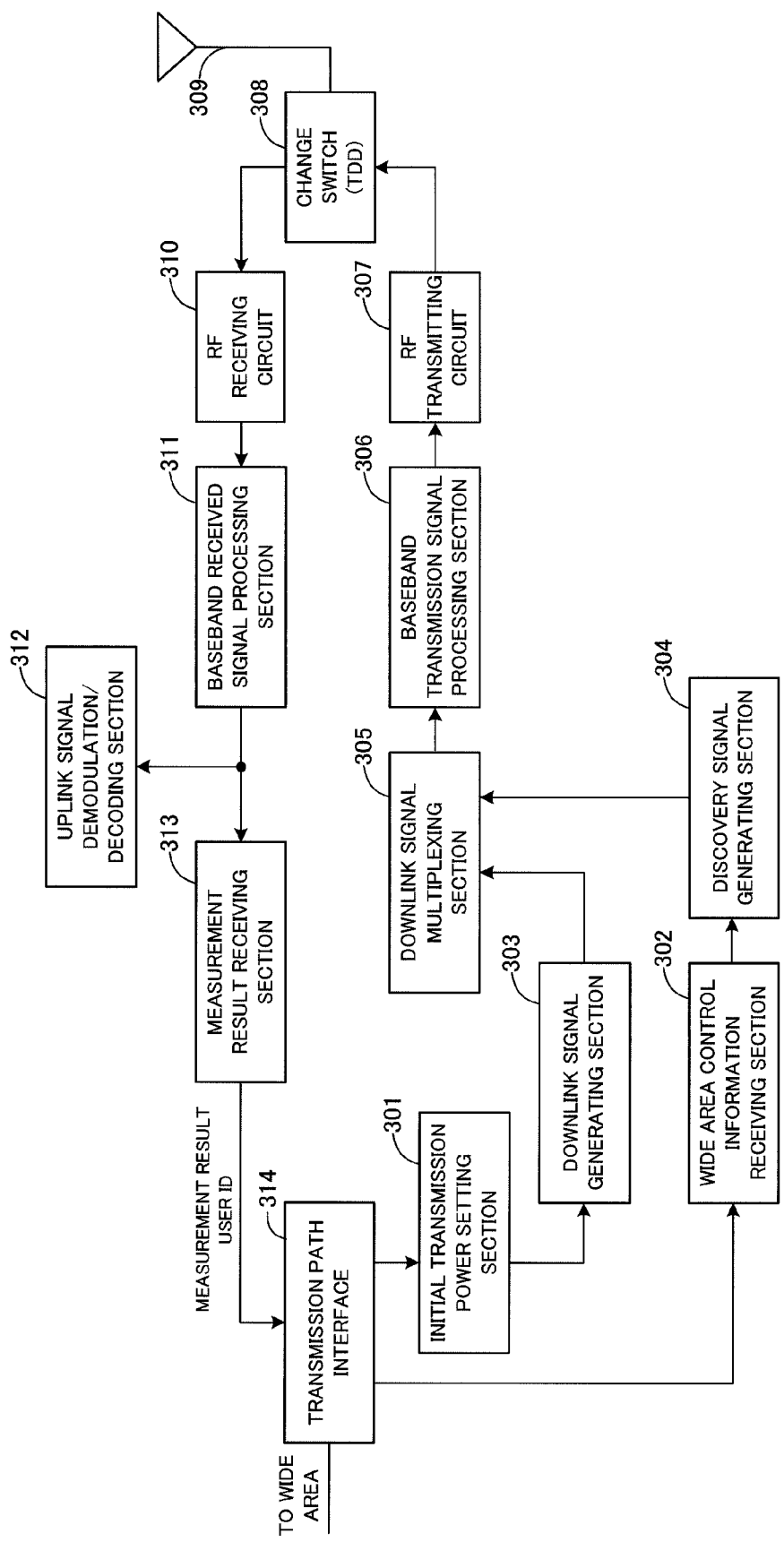
FIG. 12 is a diagram to explain an overall configuration of a local area base station apparatus.

An overall configuration of the local area base station apparatus 30 will be described with reference to FIG. 12. Assume that the local area base station apparatus 30 is arranged very close to the mobile terminal apparatus 10. The local area base station apparatus 30 has an initial transmission power setting section 301 and a wide area control information receiving section 302. Also, the local area base station apparatus 30 has, as processing sections of the transmitting sequence, a downlink signal generating section 303, a discovery signal generating section 304, a downlink signal multiplexing section 305, a baseband transmission signal processing section 306, and an RF transmitting circuit 307.

The initial transmission power setting section 301 receives initial transmission power command information from the wide area base station apparatus 20 via the transmission path interface 314. The initial transmission power setting section 301 sets the initial transmission power of the downlink data signal (PDSCH) and the downlink control signal (ePDCCH) based on the initial transmission power command information. The wide area control information receiving section 302 receives wide area control information from the wide area base station apparatus 20 via a transmission path interface 314. Here, as the wide area control information, control information for discovery signal transmission is received. The wide area control information receiving section 302 outputs the control information for discovery signal transmission to the discovery signal generating section 304.

The downlink signal generating section 303 generates a downlink data signal (PDSCH), a reference signal, and a downlink control signal (ePDCCH). In the downlink signal generating section 303, the initial transmission power of the downlink data signal and the downlink control signal is set by the initial transmission power setting section 301. The discovery signal generating section 304 generates the discovery signal based on the control information for discovery signal transmission input from the wide area control information receiving section 302. The control information for discovery signal transmission includes, for example, radio resource information and signal sequence information for transmitting discovery signals to the mobile terminal apparatus 10. The radio resource information includes, for example, the transmission interval, the frequency position, and the code of the discovery signals.

The downlink signal multiplexing section 305 multiplexes the downlink transmission data, the reference signal and the downlink control signal. Note that it may be possible to add a bit to assign the orthogonalization method to the downlink control signal. Also, the downlink signal multiplexing section 305 multiplexes DM-RS by the DM-RS configuration shown in FIG. 8B. A downlink signal for the mobile terminal apparatus 10 is input in the baseband transmission signal processing section 306, and subjected to digital signal processing. For example, in the case of a downlink signal of the OFDMA scheme, the signal is converted from a frequency domain signal to a time sequence signal through an inverse fast Fourier transform (IFFT), and has cyclic prefixes inserted therein.

Also, in the baseband transmission signal processing section 306, cyclic shift process and/or block spreading process is executed for DM-RS. In this way, the uplink DM-RS and/or the downlink DM-RS is orthogonalized. By this means, the uplink DM-RS can be orthogonalized. Consequently, it is possible to cancel DL/DL interference in the transmission mode in FIG. 9B or UL/DL interference in the transmission mode in FIG. 9C.

Then, the downlink signal passes the RF transmitting circuit 307, and is transmitted from a transmitting/receiving antenna 309 via the change switch 308 that is provided between the transmitting sequence and the receiving sequence. Note that a duplexer may be provided instead of the change switch 308.

The local area base station apparatus 30 provides, as processing sections of the receiving sequence, an RF receiving circuit 310, a baseband received signal processing section 311, an uplink signal demodulation/decoding section 312, and a measurement result receiving section 313.

An uplink signal from the mobile terminal apparatus 10 is received in the transmitting/receiving antenna 309 for the local areas, and input in the baseband received signal processing section 311 via the change switch 308 and the RF receiving circuit 310. In the baseband received signal processing section 311, the uplink signal is subjected to digital signal processing. For example, in the case of an uplink signal of the OFDMA scheme, the cyclic prefixes are removed, and the signal is converted from a time sequence signal to a frequency domain signal through a fast Fourier transform (FFT). The uplink data signal is input in the uplink signal demodulation/decoding section 312, and decoded (descrambled) and demodulated in the uplink signal demodulation/decoding section 312.

The measurement result receiving section 313 receives the discovery signal measurement results and user IDs from the uplink signal. The measurement result receiving section 313 transfers the discovery signal measurement results and user IDs to the wide area base station apparatus 20 via the transmission path interface 314.

Then, when the data size is large, the discovery signal measurement results and user IDs are transferred to the wide area base station apparatus 20, and the wide area base station apparatus 20 carries out an assignment process taking into account the load balance between the local areas. When the data size is small, the discovery signal measurement results and user IDs are not transferred to the wide area base station apparatus 20, and the local area base station apparatus 30 having received the discovery signal measurement results is assigned to the mobile terminal apparatus 10.

As described above, with the radio communication system 1 according to the present embodiment, discovery signal measurement results are reported to the local area base station apparatus 30 quickly using the PDCH defined in the radio communication scheme for the local areas. Consequently, when traffic is produced in the mobile terminal apparatus 10, subsequent uplink initial connection can be made smoothly. As a result, it is possible to provide highly efficient local area radio access specifically designed for local areas.

Also, according to the communication system of the present embodiment, since the radio access scheme and the subframe configuration are made the same between the uplink and the downlink, it is possible to enhance the symmetry between the uplink and the downlink and improve system throughput in HetNet configuration where the small cell S's use a dedicated carrier. Particularly, the present system is effective in dynamic TDD and/or communication between devices.

The present invention is by no means limited to the above embodiment and can be implemented in various modifications. For example, without departing from the scope of the present invention, it is possible to adequately change the number of carriers, the bandwidth of carriers, the signaling method, the number of processing sections, and the order of processing steps in the above description, and implement the present invention.

Also, although a case has been described with the above embodiment where the subframe configuration that is the same between the uplink and the downlink includes DM-RS configuration, the present invention is by no means limited to this, and can be applied to a case where a subframe configuration in which the control channel is the same between the uplink and the downlink. For example, it may be possible to execute uplink CSI feedback by using a signal format for an enhanced PDCCH or send back a downlink ACK/NACK by using a signal format for PUCCH. Besides, the present invention can be implemented with various changes, without departing from the scope of the present invention.

The disclosure of Japanese Patent Application No. 2012-087595, filed on Apr. 6, 2012, including the specification, drawings and abstract, is incorporated herein by reference in its entirety.

The invention claimed is:

1. A user terminal apparatus that is able to communicate with a base station apparatus in a given radio access scheme and detects the base station apparatus and/or a different communication apparatus from the base station apparatus, the user terminal comprising:
   a receiving circuit that receives demodulation reference signals based on a given demodulation reference signal resource configuration from the base station apparatus and/or the communication apparatus, in the given radio access scheme; and
   a transmission circuit that transmits demodulation reference signals based on a same demodulation reference signal resource configuration as the given demodulation reference signal resource configuration to the base station apparatus and/or the communication apparatus, in a same radio access scheme as the given radio access scheme.

2. The user terminal apparatus according to claim 1, wherein the given radio access scheme is orthogonal frequency division multiple access, and the given demodulation reference signal resource configuration comprises an uplink demodulation reference signal resource configuration.

3. The user terminal apparatus according to claim 1, wherein the given radio access scheme is single-carrier frequency division multiple access, and the given demodulation reference signal resource configuration comprises an uplink demodulation reference signal resource configuration.

4. The user terminal apparatus according to claim 2, further comprising a baseband transmission signal processing circuit that performs orthogonalization on the demodulation reference signals to transmit by using cyclic shift and/or orthogonal cover code.

5. The user terminal apparatus according to claim 4, wherein the receiving circuit receives downlink control information including a bit to assign an orthogonalization method of the demodulation reference signals to transmit.

6. A base station apparatus comprising:
   a transmission circuit that transmits demodulation reference signals based on a given demodulation reference signal resource configuration in a given radio access scheme; and
   a receiving circuit that receives demodulation reference signals based on a same demodulation reference signal resource configuration as the given demodulation reference signal resource configuration in a same radio access scheme as the given radio access scheme.

7. A communication method for a user terminal apparatus that is able to communicate with a base station apparatus in a given radio access scheme and detects the base station apparatus and/or a different communication apparatus from the base station apparatus, the communication method comprising the steps of:
   receiving demodulation reference signals based on a given demodulation reference signal resource configuration from the base station apparatus and/or the communication apparatus, in the given radio access scheme; and transmitting demodulation reference signals based on a same demodulation reference signal resource configuration as the given demodulation reference signal resource configuration to the base station apparatus and/or the communication apparatus, in a same radio access scheme as the given radio access scheme.

8. A communication system comprising: a user terminal apparatus that is able to communicate with a base station apparatus in a given radio access scheme and detects the base station apparatus and/or a different communication apparatus from the base station apparatus, wherein the user terminal apparatus comprises:

a receiving circuit that receives demodulation reference signals based on a given demodulation reference signal resource configuration from the base station apparatus and/or the communication apparatus, in the given radio access scheme; and a transmission circuit that transmits demodulation reference signals based on a same demodulation reference signal resource configuration as the given demodulation reference signal resource configuration to the base station apparatus and/or the communication apparatus, in a same radio access scheme as the given radio access scheme.

9. The user terminal apparatus according to claim 3, further comprising a baseband transmission signal processing circuit that performs orthogonalization on the demodulation reference signals to transmit by using cyclic shift and/or orthogonal cover code.

10. The user terminal apparatus according to claim 9, wherein the receiving circuit receives downlink control information including a bit to assign an orthogonalization method of the demodulation reference signals to transmit.

11. The user terminal apparatus according to claim 2, wherein the uplink demodulation reference signal resource configuration corresponds to a resource configuration that the demodulation reference signals are located on fourth and eleventh symbols in a subframe.

12. The user terminal apparatus according to claim 3, wherein the uplink demodulation reference signal resource configuration corresponds to a resource configuration that the demodulation reference signals are located on fourth and eleventh symbols in a subframe.

* * * * *